Patented May 9, 1933

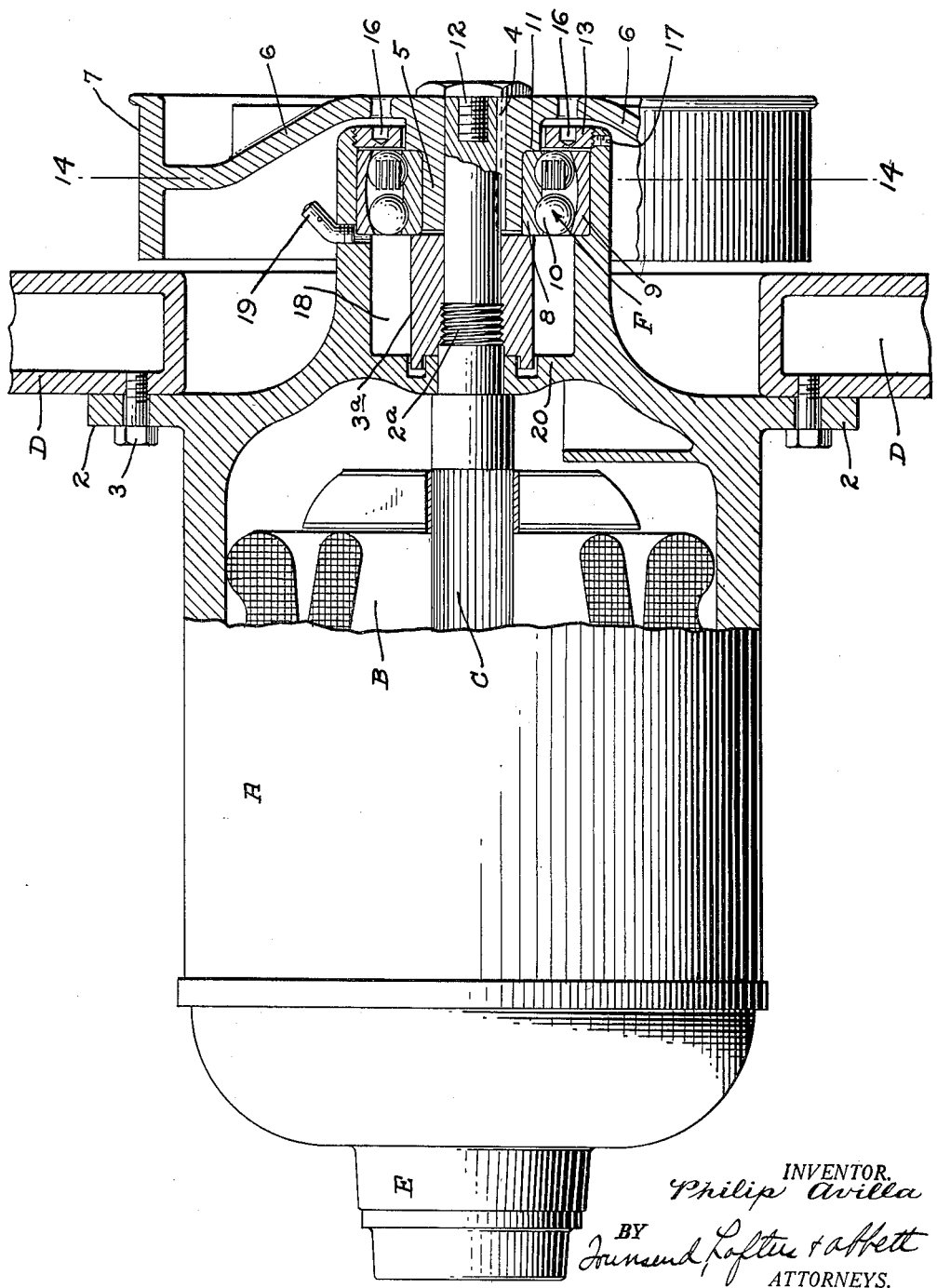

1,908,621

UNITED STATES PATENT OFFICE

PHILIP AVILLA, OF DALY CITY, CALIFORNIA, ASSIGNOR OF TWO-FIFTHS TO T. E. HIMLE, OF BURLINGAME, CALIFORNIA

PULLEY BEARING

Application filed January 8, 1930. Serial No. 419,360.

This invention relates to a pulley bearing of the anti-friction type and especially to a bearing structure which permits the load on the pulley to be centralized and evenly distributed over the surface of the anti-friction bearing.

Where a pulley is employed as an idler and particularly as a driver it is common practice to key the pulley to the driving shaft and to place the supporting bearings at one side or another of the pulley. When the belt is placed on the pulley and a load applied the load or pull of the belt will be exerted at right angles to the bearing and the load distribution on the bearings will be poor as it is much greater at the ends than in the center. A non-uniform bearing load in babbitted or bushed bearings is of no consequence. It, however, becomes quite serious where anti-friction bearings of the ball bearing type are employed as it tends to twist the ball races and throw all the load to one side or another thereby causing excess wear and material decrease in the life of the bearing.

The object of the present invention is to generally improve and simplify the construction and operation of pulley bearings of the anti-friction type; to provide a bearing structure which permits the introduction of ball bearings of the multiple or single race type; and further, to provide a pulley which is adapted to substantially enclose or extend over the bearings so that the belt pull will be exerted substantially on the center line of the ball bearing thereby insuring uniform load distribution and long life.

The pulley bearing is shown by way of illustration in the accompanying drawing, in which—

The figure is a longitudinal vertical section of the pulley and bearing, said view also showing an electric motor whereby the pulley shaft and the pulley secured thereto is driven.

Referring to the drawing in detail, A indicates an electric motor, B the armature or rotor, and C the shaft supporting the same. The motor is, in this instance, provided at one end with an annular flange 2 and is thus secured by means of bolts 3 to a frame D of suitable construction. One end of the motor is provided with a standard type of bearing such as indicated at E while the opposite end is extended as at F to form specially constructed bearing to be hereinafter described. Shaft C of the motor is also extended and is provided with a threaded portion 2a to which is secured a sleeve or collar 3a. Secured on the outer end of the shaft by a key 4 is a hub member 5. This hub is provided with spokes 6 and these in turn support a pulley rim 7. Interposed between the bearing extension F and the hub 5 of the pulley is a ball bearing generally indicated at G. The bearing illustrated consists of an inner ring or race 8 and an outer ring or race 9 and interposed balls 10, there being two races in the inner ring to permit a multiple ball race to be employed. The inner ring 8 is in this instance secured between the collar 3a and a flange 11 formed on the hub and it is tightly gripped and secured so as to rotate with the shaft and the hub by a clamping screw 12. The outer ring or race is permitted to freely rotate in the bearing extension F but it is secured against endwise movement by a nut 13.

In the present instance it will be noted that the pulley rim extends over and encloses the outer end of the bearing extension F. This is important as it permits the center line of the rim indicated at 14—14 to be substantially aligned with the ball bearing hence when the belt is applied and a pull is exerted the load is applied centrally of the anti-friction bearing and a uniform load distribution and long life is obtained. The aligning of the center portion of the rim with the anti-friction bearing is one of the important features of this invention. Another important feature is the securing of the inner ring of the ball race to the hub so as to rotate in unison therewith. This materially increases the life and wear of the inner ring as the point of the load application continuously changes during each rotation, similarly by leaving the outer ring or race 9 free to rotate a constant creeping action takes place and the load application thereto is not exerted at one place but is continuously changing.

In actual practice if it is necessary to remove the pulley it is accomplished by first removing the nut 12 and the nut 13. This is quickly and readily done in the present instance by merely inserting a spanner wrench or the like through the openings indicated at 16. When the wrench is inserted the pulley is rotated and the nut is quickly unscrewed, the pulley may then be slipped endwise off the shaft, thus also permitting removal of the ball bearing if necessary. Application of the pulley is just as simple. The ball bearing is first inserted and nut 13 is slipped endwise over the hub of the pulley after which the pulley is applied to the shaft, it being there secured by applying a spanner wrench to nut 13 after which it is only necessary to rotate the pulley to tighten the nut which may be finally secured by a set screw 17, and then to insert and secure nut 12.

Lubrication of the bearing such as here shown is also simple as the chamber indicated at 18 may be filled with grease through a fitting such as shown at 19. The grease being retained by the end wall 20 of the bearing extension F and by the nut 13 which substantially fits the exterior surface of the hub thus reducing leakage to a minimum.

While the pulley bearing is here shown in connection with the shaft of a driving motor it is obvious that the structure is equally adaptable to idler pulleys and while other features of the pulley and bearing are more or less specifically illustrated, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a structure of the character described a shaft, an annular support spaced from and concentric to the shaft, a pulley having a hub surrounding the shaft and extending into said support, an anti-friction bearing between the pulley hub and support, and a rim on the pulley having its center substantially aligned with the longitudinal center of the bearing, whereby the pull of a belt on the pulley will be transmitted to the said support through the longitudinal center of the bearing assembly.

2. The combination with a rotary shaft and a bearing support surrounding the shaft of a pulley having a hub mounted on the shaft and extending into said support, anti-friction bearings interposed between the hub and support, spokes on the outer end of the hub and curved back to support the pulley rim in a position with its center in substantially the same plane as the longitudinal center of the bearings whereby the pull of a belt on said pulley will be transmitted to said support through the bearing with uniform pressure throughout the length of the bearing structure.

PHILIP AVILLA.